United States Patent

[11] 3,582,764

| [72] | Inventor | Erich Huber<br>Sipplinger Str. 8, 8Munich, 60, Germany |
|---|---|---|
| [21] | Appl. No. | 782,634 |
| [22] | Filed | Dec. 10, 1968 |
| [45] | Patented | June 1, 1971 |
| [32] | Priority | Dec. 13, 1967 |
| [33] | | Germany |
| [31] | | 1,638,862 |

[54] CIRCUIT FOR FORCING TURNOFF OF THYRISTOR
20 Claims, 3 Drawing Figs.

[52] U.S. Cl. .................................................. 323/20,
321/45C, 323/225C
[51] Int. Cl. ...................................................... G05f 1/56
[50] Field of Search............................................ 307/252,
252 C; 321/45 C, 45 ER, 45; 323/225 CR4, 19, 23,
18, 20

[56] References Cited
UNITED STATES PATENTS

| 3,226,626 | 12/1965 | Moore............................ | 323/22X |
| 3,242,352 | 3/1966 | Long............................. | 307/252X |
| 3,365,640 | 1/1968 | Gurwicz....................... | 323/23X |

*Primary Examiner*—James D. Trammell
*Assistant Examiner*—A. D. Pellinen
*Attorney*—Smyth, Roston & Pavitt

ABSTRACT: A control circuit for extinguishing current flow in thyristors in which a capacitor discharges through a load current switching thyristor and compensates load current therein, and wherein the discharge current is augmented beyond the value available after an initial charge from the power supply subsequent to a turn off of load current flow, by providing additional energy, for example, from the load current and/or additional, appropriately timed sources other than the main voltage source directly but connected thereto.

PATENTED JUN 1 1971

3,582,764

INVENTOR:
Erich Huber

ATTORNEYS

CIRCUIT FOR FORCING TURNOFF OF THYRISTOR

The present invention relates to a control circuit for semiconductor elements of the type in which current flow can be turned on by pulses applied to a control electrode but wherein current flow continues even after the turn on pulse has decayed. Such a semiconductor device is often called a thyristor.

Thyristors are used, for example, as load current switches in drive circuits for intermittently operated devices. If the supply voltage is AC load current flow is interrupted in the thyristor when the polarity reverses. If the supply voltage is DC, current flow in the thyristor is terminated by means of a current pulse derived, for example, from a capacitor and compensating the load current in the thyristor. Initially, this capacitor is charged through an auxiliary thyristor controlled by a pulse train for that purpose. Subsequently, the polarity of the charge on the capacitor is reversed and the charge reversal is controlled, for example, through another semiconductor element such as another auxiliary thyristor.

The recharging or polarity reversal of the capacitor is inherently accompanied by a voltage loss and, accordingly, the capacitor has to be dimensioned to be quite large to furnish the required energy for extinguishing current flow in the principal or load current switching thyristor. Moreover, the extinguishing process is based on the principle of load current flow compensation. Hence the capacitor must store enough energy to provide sufficient current for balancing maximum possible load.

It is also known to include an inductance in the load current path in order to limit the rate of load current increase. Furthermore, it is known to include an inductance in the current path of the auxiliary thyristor which controls the discharge of the capacitor. This inductance likewise limits the rate of current increased, particularly during the load current extinguishing process.

It is also known to include an inductance in the current path from the semiconductor element controlling charge reversal in the capacitor. This latter inductance is instrumental directly in the charge reversing process. At the beginning of charge reversal the capacitor discharges and the energy is stored magnetically in the latter inductance. Subsequently, the inductance discharges and provides the stored energy to the capacitor but at the opposite polarity. It is this the equivalent to a half-cycle of an oscillation of a resonance circuit established by the capacitance and by the inductance. The unidirectional characteristics of the semiconductor element connected in series with the inductance prevents the reverse phase of such oscillation to occur.

It is, therefore, a characteristic of known circuits that inductances are provided in various locations in the circuit and for particular purposes, but these inductances do not coact. Also, the known circuits do not permit the voltage of the recharged capacitor to be equal to or even to exceed the supply voltage from which the initial charge of the capacitor has been derived, as it is this main power supply voltage which, during a load current pause, furnishes the charge for the capacitor which charge becomes operative to terminate the next load current pulse.

It is an object of the present invention to improve the intermittent operation of load circuits using forced turn off of load current switching thyristors. The thyristors particularly may control pulsating current flow for an electric drive, or the like. The circuit improved in accordance with the invention includes a capacitor storing energy needed to extinguish the current flow in a load current conducting and switching thyristor. An auxiliary semiconductor device such as another thyristor controls the capacitor discharge to cause current flow extinction in the load current switching thyristor. The circuit may further include another auxiliary semiconductor element, for example, another auxiliary thyristor to control the charge reversal on the capacitor to obtain the necessary polarity. The circuit improved in accordance with the invention includes inductances respectively connected in series with the several semiconductor elements.

It is a characteristic feature of the present invention that the inductances connected in series with the auxiliary semiconductor elements are physically positioned to be influenced by the magnetic field of the inductance (principal inductance) connected in series with the principal load current conducting and switching thyristor, and in such a manner that the buildup of the magnetic field in the principal inductance is effective in the inductance connected in series with the semiconductor elements controlling the charge reversal to augment the reversing charge. Upon decay of the magnetic field, as provided by the principal inductance, i.e., during load current turn off, a current pulse is induced in the inductance connected in series with the element controlling the discharge of the capacitor for load current extinction. Accordingly, the decaying load current is caused to augment the load current extinguishing process to thereby speed up its own extinction in the principal, load current switching thyristor. By operation of the unidirectional characteristics for current flow of the several semiconductor elements, the inductive coupling between the inductances is polarized so that the resulting voltage and current augmenting processes occur likewise unidirectionally, in the desired direction and without producing undesired feedbacks in the opposite direction during the respective opposite induction.

A voltage-to-voltage conversion means may be provided to be operated in synchronism with the off phases of the load current conducting and switching thyristor, to charge the capacitor to a voltage higher than established by operation of the load circuit power supply upon load current turn off. Another voltage conversion means can be provided to operate in phase with the load current conducting and switching thyristor to augment the reversed charge so as to obtain a higher charge on the capacitor than is obtainable by charge reversal alone.

While the specification concludes with claims particularly pointing out and distinctly claiming the subject matter which is regarded as the invention, it is believed that the invention, the objects and features of the invention, and further objects, features and advantages thereof, will be better understood from the following description taken in connection with the accompanying drawings in which:

Figure 1:
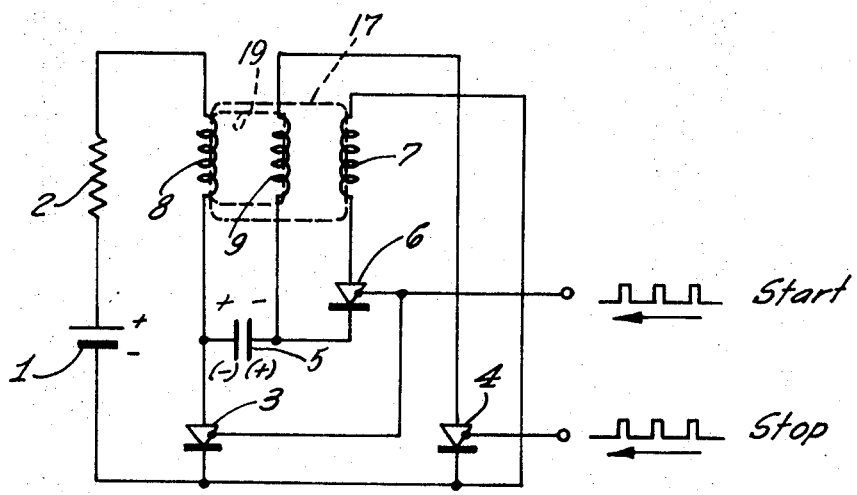
FIG. 1 is a circuit diagram of the preferred embodiment of the present invention.

Proceeding now to the detailed description of the drawings, in FIG. 1 thereof there is illustrated a first embodiment in accordance with the principle of the present invention. A voltage source 1 provides power and voltage to a load 2 via the principal load current conducting and switching thyristor 3. The control electrode of this thyristor receives pulses of a train for "firing." As the voltage source 1 provides DC current flow through load 2 and thyristor 3, the load current must be interrupted by operation of additional circuit elements in order to obtain intermittent operation of the load.

A thyristor 4 is connected in series with a capacitor 5 and across the main electrodes of thyristor 3. The control electrode of thyristor 4 receives, as is symbolically indicated, a pulse train serving as triggering or firing signals for the thyristor. Thyristor 4 is fired to cause capacitor 5 to discharge through thyristors 3 and 4 and at a direction opposite to the direction of principal or load current flow in thyristor 3 to extinguish load current flow therein.

During conduction of thyristor 3, i.e., during load current flow, capacitor 5 has a charge at a polarity as indicated by parenthesis. As thyristor 4 fires, the capacitor discharges, as stated, in a direction opposing load current flow in thyristor 3 until current in the latter is turned off. This does not extinguish current flow in thyristor 4, but current flow continues until capacitor 5 is recharged, but at opposite polarity, and as indicated without parenthesis, whereupon the voltage across thyristor 4 drops below value necessary to maintain the current flow therethrough. The capacitor has now charged but at wrong polarity.

A third thyristor 6 is connected in parallel with thyristor 4 but for opposite direction of easy current conduction. Thyristor 6 controls charge reversing in capacitor 5. If the principal thyristor 3 is fired concurrently with the charge reversing thyristor 6, capacitor 5 discharges through the principal thyristor 3 as well as through thyristor 6. This current flows in direction of easy conduction of both of them. The energy flowing off the capacitor is stored in an inductance 7 connected in series with thyristor 6. Subsequently, the energy is returned from the inductance to capacitor 5 to recharge capacitor 5 at the polarity indicated in parenthesis. It is this the equivalent of a half wave of an oscillation as provided by the LC circuit established by capacitor 5 and inductance 7. A half wave of opposite polarity cannot succeed the charge reversing on capacitor 5 as upon completion of the recharging current flow into capacitor 5, current flow in this LC circuit, and therefore in thyristor 6, extinguishes and cannot reverse its direction, so that capacitor 5 holds its charge (except for leakage), and at the correct polarity for load current extinction.

It can be readily seen that intermittent load current pulses are produced due to periodic firing of the load current switching thyristor 3 whereby concurrently the charge on capacitor 5 reverses polarity. At predetermined times after each firing, capacitor 5 is caused to discharge by firing thyristor 4 for extinguishing the load current and for subsequently recharging the capacitor 5. Thyristors 3 and 4 are thus fired for this intermittent operation by suitably provided interspaced pulse trains.

In addition to the basic operation as described, the following transpires: as current flow commences in load 2 an inductance 8 connected in series therewith and with the principal thyristor 3, provides a magnetic field in its environment which increases in the initial phase of a load current pulse. In accordance with the principles of the invention, inductance 7 is arranged in that magnetic field and, accordingly, there is inductive coupling between the inductances 7 and 8, through an air gap as denoted by phantom line 17. As a consequence a voltage is induced in inductance 7 during the increase of the magnetic field as provided by inductance 8. This voltage has polarity so that the resulting current in inductance 7 adds to the charge reversing current, as controlled through thyristor 6, to increase the amount of energy returned by the inductance 7 to capacitor 5 during the charge reversing process. In other words, the increasing load current augments the energy stored in inductance 7 and as returned to capacitor 5 for charge reversal thereon. Accordingly, after charge reversal, capacitor 5 holds a voltage which is possibly higher than the voltage provided by source 1 and used to provide the initial charge thereon; at least some of the losses in energy inherent in the reversal process are compensated through this additional supply of energy.

It follows from the foregoing that capacitor 5 can be dimensioned smaller than in heretofore known circuits, or, conversely, for similar sized capacitors, a larger amount of energy is available for extinguishing load current flow in the principal thyristor. Moreover, this relative increase in energy available for extinguishing current flow in thyristor 3 is higher, the higher the load current flow in the principal circuit, so that a larger extinguishing current is made available for the turn off.

It has not yet been mentioned that an inductance is connected in series with thyristor 4. As thyristor 4 fires capacitor 5 discharges through inductance 9 and into thyristor 3, as described. Due to the previous charge reversal, capacitor 5 discharges in a direction opposing load current flow through thyristor 3 to extinguish load current therein by compensation. Concurrently, the magnetic field in inductance 8 collapses. In accordance with the principles of the invention, inductance 9 is positioned in the vicinity of inductance 8, there being an air gap 19 accordingly, so that by inductive coupling between these two inductances, the load current extinguishing current is increased. In other words, the decaying load current is inductively coupled into the extinguishing circuit to augment load current extinguishing discharge from capacitor 5.

It follows, therefore, that through the particular arrangement of inductances, the available energy is more readily utilized to positively ensure load current extinction. As was mentioned above, it is an additional object of the present invention to provide a circuit which includes a voltage converter charging the extinguishing capacitor in a similar way as load current source 1 does, but obtaining a higher voltage as is obtainable from the current source. The voltage converter is controlled to operate inversely to the operation of the intermittently operated load current switching thyristor.

Figure 2:
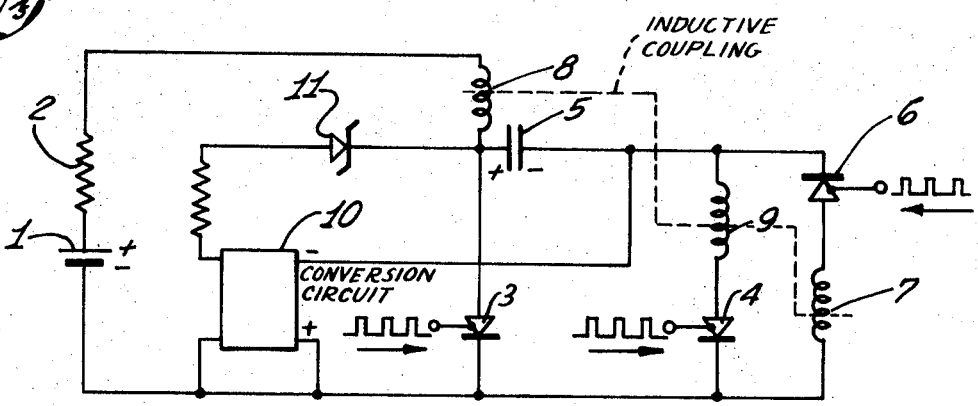
FIG. 2 illustrates a circuit diagram showing a particular improvement of the circuit illustrated in FIG. 1.

FIG. 2 illustrates an embodiment which includes a voltage-to-voltage conversion circuit 10 which can also be designated a recharge converter. Voltage to voltage conversion circuits are generally known, see for example RCA Transistor Manual, pages 434, 437, 439. GE Transistor Manual, page 237. Also U.S. Lets. Pats. Nos. 3,343,061; 3,331,008; 3,320,151 and others disclose suitable converters. Converter 10 has a pair of input terminals connected respectively to anode and cathode of the principal thyristor 3. A Zener diode 11 and a series resistor is included in the circuit as connected between the one converter input terminal and the anode of thyristor 3. The Zener diode establishes a response threshold for the converter to respond only in case the minimum voltage across thyristor 3 is exceeded. Thus, converter 10 responds during a period of nonconduction, i.e., during load current pauses.

The output of converter 10 provides a voltage which is higher than the supply voltage from battery 1 and charges capacitor 5 at indicated polarities. Accordingly, prior to the commencing of current flow through thyristor 3, capacitor 5 has already available a sufficiently high extinguishing energy. After recharge, i.e., after charge reversal as described, the available energy is still sufficiently high to cause current flow extinction in the principal load current switching thyristor, in spite of possibly occurring losses.

In order to develop the inventive concept further, it is suggested to provide still another voltage-to-voltage conversion circuit for charging the capacitor at a polarity opposite the polarity of the charge as provided from the current source 1 and at a higher voltage than provided by the latter. In addition, this additional converter is in-phase controlled in dependence upon the state of conduction of the principal thyristor. This additional voltage converter can be used in lieu of or in addition to converter 10 of FIG. 2. Preferably, the input of this additional voltage converter, designated also in the following as a postcharge converter, is directly or indirectly controlled from the firing voltage for the principal thyristor. This kind of arrangement is particularly advantageous if current conduction through the principal thyristor is maintained for a rather long period of time so that leakage discharge of capacitor 5 could reduce the amount of energy available for extinction to become insufficient to extinguish load current flow in the principal thyristor. This leakage discharge may occur through various loss resistances and other leakage paths in the circuit.

Figure 3:
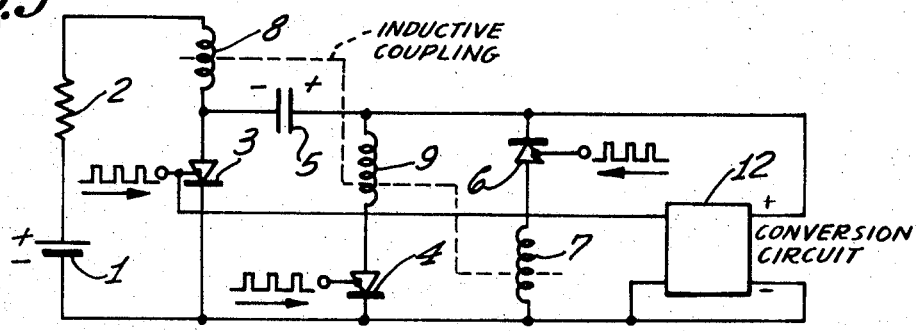
FIG. 3 illustrates a circuit diagram which is a different improvement of the circuit shown in FIG. 1.

The voltage converter 12, shown in FIG. 3, opposes this loss in energy and is effective as long as the principal thyristor 3 is conductive. The output of converter 12 provides a charge to capacitor 5 after charge reversal thereon to obtain a higher charge and at a voltage higher than capacitor 5 can be charged through battery 1.

I claim:
1. A circuit for intermittent operation of an electric load circuit from a source supply voltage comprising:
   first means including a thyristor for operatively connecting the load of the load circuit to the source to control current flow through the load, the thyristor having conductive and nonconductive states;
   second means connected to control the thyristor to change from the nonconductive to the conductive state;

third means including a capacitor and switching means connected across the thyristor to control discharge of the capacitor through the thyristor when conductive to extinguish current flow therein and to render the thyristor nonconductive the discharge current reversing the charge on the capacitor;

fourth means connected to the capacitor and operating concurrently with operation of the second means to reverse the polarity of the charge on the capacitor through the conducting thyristor; and fifth means connected to the load circuit and to the capacitor to augment the charge on the capacitor, for the capacitor to obtain a charge on the capacitor in excess of the charge as resulting from the supply voltage for the load.

2. A circuit as set forth in claim 1, the fifth means coupling the capacitor to the load circuit to provide to the capacitor a charging voltage in excess of the voltage of the source during onset of load current flow in the thyristor, there being additional circuit means for augmenting the charge on the capacitor further.

3. A circuit as set forth in claim 1, the fifth means including a first inductance in the load circuit and a second inductance connected in series with the capacitor and inductively coupled to the first inductance.

4. A circuit as set forth in claim 1, the fifth means including a voltage-to-voltage conversion means having its input connected to the load circuit to be controlled in phase opposition to the thyristor, and having its output connected to the capacitor to increase the charge on the voltage during the period of nonconduction of the thyristor.

5. A circuit as set forth in claim 1, the fifth means including a voltage-to-voltage conversion means connected to be controlled in synchronism with the thyristor to control the charging of the capacitor during period of conduction of the thyristor.

6. A circuit for intermittent operation of an electric load circuit from a source supply voltage comprising:

first means including a thyristor for operatively connecting the load of the load circuit to the source to control current flow through the load, the thyristor having conductive and nonconductive states;

second means connected to control the thyristor to change from the nonconductive to the conductive state;

third means including a capacitor and switching means connected across the thyristor to control discharge of the capacitor through the thyristor when conductive to extinguish current flow therein and to render the thyristor nonconductive;

fourth means connected to the load circuit and providing a particular current pulse in response to the decaying load current as the current flow in the thyristor is being extinguished; and fifth means connecting the fourth means to the capacitor to add the current pulse to the capacitor discharge through the thyristor to augment the discharge current beyond the value available by discharge of the capacitor alone.

7. In a circuit for forcing turnoff of load current flow in a first semiconductor element controllable for load current flow command by triggering through a control electrode, there being a capacitor connected to the first semiconductor element through a second semiconductor element for controlling current flow through the first element for extinguishing load current flow therein, there being a third controllable semiconductor element for control of the reversal of the charge on the capacitor obtained during current conduction through the second semiconductor element, the combination comprising:

first, second and third inductances respectively connected in series with the first, second and third semiconductor elements and magnetically coupled to each other for inducing auxiliary voltages in the second and third inductances respectively upon commencement and decay of the load current flow through the first inductance and the first semiconductor element, augmenting the respective current flow through the second and third inductances.

8. A circuit as set forth in claim 7, the inductances being coupled to each other through air gaps.

9. A circuit as set forth in claim 7, including circuit means controlled in phase opposition to the states of current conduction and nonconduction of the first semiconductor element for controlling charge of the capacitor during conduction phases of the first semiconductor element.

10. The circuit as set forth in claim 9, the circuit means being controllable by means of a control circuit connected through a Zener diode to the first semiconductor element for control of the circuit means in direct response to the current flow through the first semiconductor element.

11. The circuit as set forth in claim 7, including circuit means connected to the capacitor and connected to be operated in phase synchronism with current flow through the first semiconductor element for charging the capacitor to a voltage at least equal to the operating voltage effective in the load circuit.

12. A circuit for the control of current pulses through a load, using a semiconductor element of the thyristor type comprising:

a first inductance connected in the load circuit;

a series circuit including a capacitor, a second controllable semiconductor element and a second inductance, the series circuit being connected in parallel to the first semiconductor element to control capacitor discharge through the thyristor-type element for extinguishing load current therein and subsequently recharging the capacitor at opposite polarity, the first and second inductances being inductively coupled to each other to increase the capacitor discharge current during decay of load current through the first inductance and the first semiconductor element; and means connected for producing polarity reversal of the charge on the capacitor after recharging thereof.

13. A circuit as set forth in claim 12, the means for producing charge reversal including means for augmenting the capacitor voltage beyond value obtainable by charge reversal alone.

14. A circuit as set forth in claim 12, including means operating at least during charge reversal to augment the capacitor charge.

15. A circuit as set forth in claim 14, the means to augment including means coupled to the load circuit to derive from the onsetting load current energy to be included as additional charge in the capacitor upon charge reversal.

16. A circuit as set forth in claim 14, the augmenting means including a voltage-to-voltage conversion means operated in synchronism with current conduction through the first semiconductor element.

17. A circuit for the control of current pulses through a load using a semiconductor element of the thyristor type, there being means to intermittently fire the thyristor, comprising:

a first inductance connected in the load circuit;

a capacitor having one electrode connected to the thyristor;

a controllable discharge circuit for the capacitor to force discharge current flow therefrom through the thyristor to compensate load current therein and to extinguish the load current flow; and a recharge circuit for the capacitor, including a controllable semiconductor element and a second inductance coupled to the first inductance to provide a recharge voltage component in the response to load current increase after firing of thyristor and as effective in the first inductance.

18. A circuit as set forth in claim 17, wherein the discharge circuit operates to recharge the capacitor and the recharge circuit reverses the polarity of the charge, including means operated in response to current flow in the load circuit to augment the charge on the capacitor prior to charge reversal.

19. A circuit as set forth in claim 18, the means to augment being voltage-to-voltage conversion means operated in synchronism with a load current pause to additionally charge the capacitor prior to charge reversal.

20. A circuit as set forth in claim 17, the discharge circuit being coupled to the load circuit to augment the discharge current by drawing energy from the decaying load current.